United States Patent
Kinkead et al.

(10) Patent No.: US 6,817,552 B2
(45) Date of Patent: Nov. 16, 2004

(54) BROADCAST SPREADING TOP DRESSER

(75) Inventors: Scott Kinkead, Minneapolis, MN (US); Thomas E. Isaman, Ham Lake, MN (US); Donavon D. Kotula, Apple Valley, MN (US); Steven Ferguson, Scandia, MN (US)

(73) Assignee: Turfco Manufacturing, Inc., Minneapolis, MN (US)

( * ) Notice: Subject to any disclaimer, the term of this patent is extended or adjusted under 35 U.S.C. 154(b) by 297 days.

(21) Appl. No.: 10/068,775

(22) Filed: Feb. 6, 2002

(65) Prior Publication Data

US 2003/0155453 A1 Aug. 21, 2003

(51) Int. Cl.[7] ............................................... A01C 17/00
(52) U.S. Cl. ..................... 239/668; 239/672; 239/673; 239/676; 239/679; 239/680
(58) Field of Search .................. 239/654, 655, 239/661, 668, 672, 673, 676, 679, 680, 681, 682

(56) References Cited

U.S. PATENT DOCUMENTS

| | | | |
|---|---|---|---|
| 927,141 A | 7/1909 | Hackney | ................... 239/679 |
| 2,500,682 A | 3/1950 | Hoffstetter | |
| 3,097,851 A | 7/1963 | Cohrs et al. | ................. 239/679 |
| 3,113,784 A | 12/1963 | Swenson et al. | |
| RE25,709 E | 1/1965 | Swenson et al. | |
| 3,290,046 A | 12/1966 | Bell et al. | ................ 239/682 X |
| 3,332,691 A | 7/1967 | Swenson et al. | |
| 3,344,993 A | 10/1967 | Wilder et al. | |
| 3,441,039 A | 4/1969 | Rawson | |
| 3,550,866 A | 12/1970 | Swenson | |
| 3,559,894 A | 2/1971 | Murray et al. | |
| 3,679,098 A | 7/1972 | Weiss | |
| 3,682,395 A | 8/1972 | van der Lely et al. | |
| 3,693,890 A | 9/1972 | Torrey | ........................ 239/668 |
| 3,703,260 A | 11/1972 | Grabske | |
| 3,790,090 A | 2/1974 | Lorenc et al. | |
| 3,904,129 A | 9/1975 | Lorenc | |

(List continued on next page.)

FOREIGN PATENT DOCUMENTS

EP          0404141        12/1990    ................. 239/665

OTHER PUBLICATIONS

Owner's Manual, TERRATOPPER T–750, TerraCare Products Co., Inc., P.O. Box 250, Pardeeville, WI (undated but prior art to application).
Photograph of T–1000, TerraCare Products Co., Inc., P.O. Box 250, Pardeeville, WI.
MULTISPREAD™, printed from www.earthandturf.com (date unknown).

Primary Examiner—Gene Mancene
Assistant Examiner—Thach H. Bui
(74) Attorney, Agent, or Firm—Alan D. Kamrath; Nikolai & Mersereau, P.A.

(57) ABSTRACT

A broadcast spreading top dresser (10) includes a diverter (200) which can be positioned in an upper position for light applications and a lower position for heavy applications, with the diverter (200) extending through a slot (210) in an upper sheet (58) of the spinner assembly (40) and beyond and below the upper sheet (58) in the lower position. The leading edges (204) of the diverter (200) are spaced from the circular disks (154) of the spinners (54) intermediate the radial position that the material is dispensed unto the spinners (54) and the maximum rearward extent of the circular disks (154). The lower edges of the diverter (200) extend at differing distances into the thickness of the propelled top dressing material. The metering gate (72) is prevented from being inadvertently manually pivoted between first and second ranges of spacings from the conveyor (140) by a stop (180) having a spring based plunger (182), with the free end of the plunger (182) sliding on the face of the side plate (174) of the metering gate (72) in the second range while the plunger (182) abuts with an edge of the side plate (174) in the first range.

25 Claims, 7 Drawing Sheets

U.S. PATENT DOCUMENTS

| | | |
|---|---|---|
| 4,023,689 A | 5/1977 | Taylor et al. |
| 4,032,074 A | 6/1977 | Amerine |
| 4,098,433 A | 7/1978 | Oligschlaeger |
| 4,108,010 A | 8/1978 | Taylor et al. |
| 4,124,167 A | 11/1978 | Coleman .................... 239/673 |
| 4,212,428 A | 7/1980 | Walker |
| 4,367,848 A | 1/1983 | Ehmke et al. .......... 239/676 X |
| 4,438,873 A | 3/1984 | Kaercher, Jr. |
| 4,473,184 A | 9/1984 | Martin |
| 4,583,693 A | 4/1986 | Harder |
| 4,591,102 A | 5/1986 | Clarke .................... 239/682 X |
| 4,685,619 A | 8/1987 | Harder |
| 4,700,895 A | 10/1987 | Takata |
| 4,804,145 A | 2/1989 | Seymour et al. |
| 4,842,202 A | 6/1989 | van der Lely et al. |
| 5,046,664 A | 9/1991 | van der Lely et al. |
| 5,096,125 A | 3/1992 | Wise et al. |
| 5,170,947 A | 12/1992 | Houle et al. |
| 5,170,948 A | 12/1992 | Glick et al. |
| 5,186,396 A | 2/1993 | Wise et al. |
| 5,307,952 A | 5/1994 | Worrel et al. ........... 239/672 X |
| 5,307,965 A | 5/1994 | Worrel ...................... 222/616 |
| 5,370,321 A | 12/1994 | Bianco |
| 5,478,104 A | 12/1995 | Worrel et al. ............... 280/699 |
| 5,501,403 A | 3/1996 | van Vooren |
| 5,501,405 A | 3/1996 | Doornek |
| 5,533,676 A | 7/1996 | Conley |
| 5,645,228 A | 7/1997 | Zwart |
| 5,802,994 A | 9/1998 | Kinkead et al. |
| 5,842,649 A | 12/1998 | Beck et al. |
| 5,947,391 A | 9/1999 | Beck et al. |
| 5,950,933 A | 9/1999 | Balmer ...................... 239/655 |
| 5,976,011 A | 11/1999 | Hartman |
| 5,992,134 A | 11/1999 | Blide et al. |
| 6,024,033 A | 2/2000 | Kinkead et al. |
| 6,058,860 A | 5/2000 | Kinkead et al. |
| 6,149,079 A | 11/2000 | Kinkead et al. |
| 6,202,944 B1 | 3/2001 | McCory ..................... 239/658 |
| 6,220,532 B1 | 4/2001 | Manon et al. |

BROADCAST SPREADING TOP DRESSER

BACKGROUND OF THE INVENTION

The present invention generally relates to apparatus for dispensing or spreading material and, more particularly, to apparatus for top dressing terrain, and, in a most preferred form, to broadcast spreading top dressers.

Various apparatus exist for applying top dressing to the turf of golf courses, lawns, football fields, baseball fields, soccer fields, parks, recreational areas, and related surfaces; for applying calcined clay on baseball diamonds; for sanding icy sidewalks and driveways; and for similar applications requiring an even dispersion of material at pre-selected rates. Examples of such apparatus are shown in U.S. Pat. No. 4,438,873 which has been widely and very successfully marketed under the trademark TURFCO METE-R-MATIC and in U.S. Pat. No. 5,307,952 which has been widely and very successfully marketed under various trademarks. With the increasing awareness of the importance of top dressing in turf management, an increasing need exists for improved dispensers to allow the effective, efficient application of material with minimal damage to the turf and with increased ease of operation.

Specifically during top dressing of selected turfs, such as golf greens for example, it is optimal to spread the top dressing material evenly without clumps or bunches. Even distribution without clumps is not realized when the top dressing material is dispensed at a varying rate from the hopper. Further, although top dressers of the drop type disclosed in U.S. Pat. Nos. 4,438,873 and 5,307,952 have been highly effective at applying top dressing evenly to turf, these top dressers only dispense a ribbon of top dressing that is approximately equal to the width of the top dresser conveying belt. The width of the ribbon of top dressing frequently determines the number of passes required to properly top dress a green or other surface. That is, the narrower the ribbon of top dressing, the more time is required for the top dressing operation. As the machinery and operator must be on the green during a top dressing operation, the green is typically not playable during the top dressing operation. This slows play on the entire golf course, decreasing the number of golfers who can play the course on a given day and decreasing the level of satisfaction for the golfers who get to play the course. Thus, a top dresser that can evenly distribute a ribbon of top dressing wider than the width of the top dresser conveying belt is desirable. Further, such drop top dressers were not very effective in spreading extremely minimal amounts of top dressing material. Distributing minimal amounts of dressing material is desirable for fine tuning the performance characteristics of golf greens and, in other applications, allows for the use of more concentrated fertilizers and chemical treatments. It also reduces the number of refills to the hopper to cover a particular surface area to be treated.

Although broadcast spreaders are known for spreading seed and fertilizers, broadcast spreaders had not widely penetrated the top dressing market until the introduction of the broadcast spreading top dresser of the type of U.S. Pat. No. 6,149,079. In particular, most previous commercially available broadcast spreaders utilized mesh type conveyors having hinged links that are formed from metal or similar material. These hinged links form an array of cells open at the top and bottom. These hinges can require regular repair and maintenance to assure proper operation. Additionally, such previous broadcast spreaders were often driven by the power take off of the towing vehicle, with the spinners and conveyor being driven together. This increases the power demands on the towing vehicle. Further, with previous broadcast spreaders, material was often present on the spinners at initiation of spinner rotation. This material may initially be dispensed in a clump or, at a minimum, may initially be distributed at a rate greater than under normal operating conditions. Thus, previous commercially available broadcast spreaders required a towing vehicle of considerable power and including a power take off, dispensed material in an amount greater than desired in a green top dressing function and unevenly at least at the start of spinner operation.

Top dressers of the broadcast spreading type disclosed in U.S. Pat. No. 6,149,079 have penetrated significant portions of the top dressing market. In particular, considerable market success has been experienced by the top dressers of the type of U.S. Pat. No. 6,149,079 because of their ability to spread top dressing over wide areas while avoiding the problems and deficiencies of previous commercially available broadcast spreaders.

However, top dressers of the type of U.S. Pat. No. 6,149,079 were unable to dispense top dressing at heavy rates equivalent to that with top dressers of the drop type. Prior attempts to dispense top dressing with spinners at heavier rates utilized shrouds such as of the type disclosed in U.S. Pat. No. 4,032,074, which in some cases were moveable between operable and nonoperable positions. However, such shrouds basically stopped the kinetic energy of the top dressing material being propelled radially by the spinners and deflected the material downwardly in a controlled configuration. However, it should be immediately appreciated that the width of the dispersed material perpendicular to the operation direction is then a function of the angle of the sides of the shroud, that the beneficial effect of radial propulsion by the spinners is lost, and in the case of most powered spinners, did not result in even distribution. Thus, turf managers who owned top dressers of the broadcast spreading type also were required to purchase top dressers of the drop type to perform both light and heavy applications of top dressing.

Particularly and specifically for heavy applications, the distribution pattern for materials distributed by one or more spinners of a broadcast spreader can be uneven. The distribution of material can be uneven along either or both the direction that the broadcast spreader is moving and the width perpendicular to the direction that the broadcast spreader is moving. Controlling the distribution of material along the direction that the broadcast spreader is moving is typically controlled by a combination of spinner configuration, broadcast spreader ground speed and spinner velocity. However, controlling the distribution of material from a powered broadcast spreader perpendicular to the direction that the spreader is moving has not been satisfactorily addressed by prior broadcast spreaders. Thus, prior broadcast spreaders have continued to generate an uneven depth of material perpendicular to the direction of the broadcast spreader's movement. Generally, the uneven depth is an artifact of loading the material at a particular location on the spinner. The placement of material at a particular position on the spinner will inherently concentrate the distribution of that material within a particular radial arc about the axis of rotation of the spinner. The particular radial arc is determined by the configuration of the spinner and the speed that the spinner is rotating. Providing multiple spinners typically merely changes the distribution profile across the perpendicular and, typically, results in an uneven distribution profile across the perpendicular.

Thus, a need continues to exist for methods and apparatus for providing both light and heavy applications of top dressing material to turf and in a manner to distribute the material evenly in either application.

SUMMARY OF THE INVENTION

The above-listed needs and other problems in the field of top dressing are solved, in the most preferred form, by providing a top dresser including a diverter to contact the material distributed by the spinners and to deflect the propelled material to more evenly distribute the material being spread across its width perpendicular to the operation direction that the top dresser is moving.

In most preferred aspects, the forward end is spaced from the circular disk of the spinner and located intermediate where the top dressing material is dispensed unto the top of the circular disk and the maximum rearward extent of the circular disk in the operation direction. In the most preferred form, the rearward edge of the diverter is spaced radially intermediate the forward edge of the diverter and the maximum rearward extent in the operation direction.

In other aspects of the present invention, the diverter has a lower edge extending at different distances into the thickness of the top dressing material being propelled radially from the rotating spinners.

In other preferred aspects of the present invention, the metering gate of the top dresser is prevented from being moved inadvertently between a first range of spacings from the conveyor and a second range of spacings from the conveyor different than the first range of spacings.

In still other preferred aspects of the present invention, the diverter for a spinner assembly is insertable through a slot in a sheet located perpendicular to the axis and extending generally perpendicular to the spinner, with the diverter being positionable in a first position not detrimentally extending beyond the plate towards the spinner and in a second position extending beyond the plate towards the spinner.

It is thus an object of the present invention to provide a novel top dresser.

It is further an object of the present invention to provide such a novel top dresser for evenly spreading top dressing material in both light and heavy applications.

It is further an object of the present invention to provide such a novel top dresser of the broadcast type.

It is further an object of the present invention to provide such a novel broadcast spreading top dresser operable in heavy and light spread modes.

It is further an object of the present invention to provide such a novel broadcast spreading top dresser able to evenly distribute material in a heavy spread mode.

It is further an object of the present invention to provide such a novel broadcast spreading top dresser preventing inadvertent manual movement of the meter gate of the hopper between heavy and light spread modes of operation.

It is further an object of the present invention to provide such a novel broadcast spreading top dresser having a unique manner of adjustably mounting a diverter to the spinner assembly not requiring disassembly or loose parts when switching between different modes of operation.

All of the above objectives can be satisfied in the field of material dispensing by the illustrative embodiment of a top dresser according to the preferred teachings of the present invention, detailed descriptions of which are described in connection with the drawings.

Figure 1:
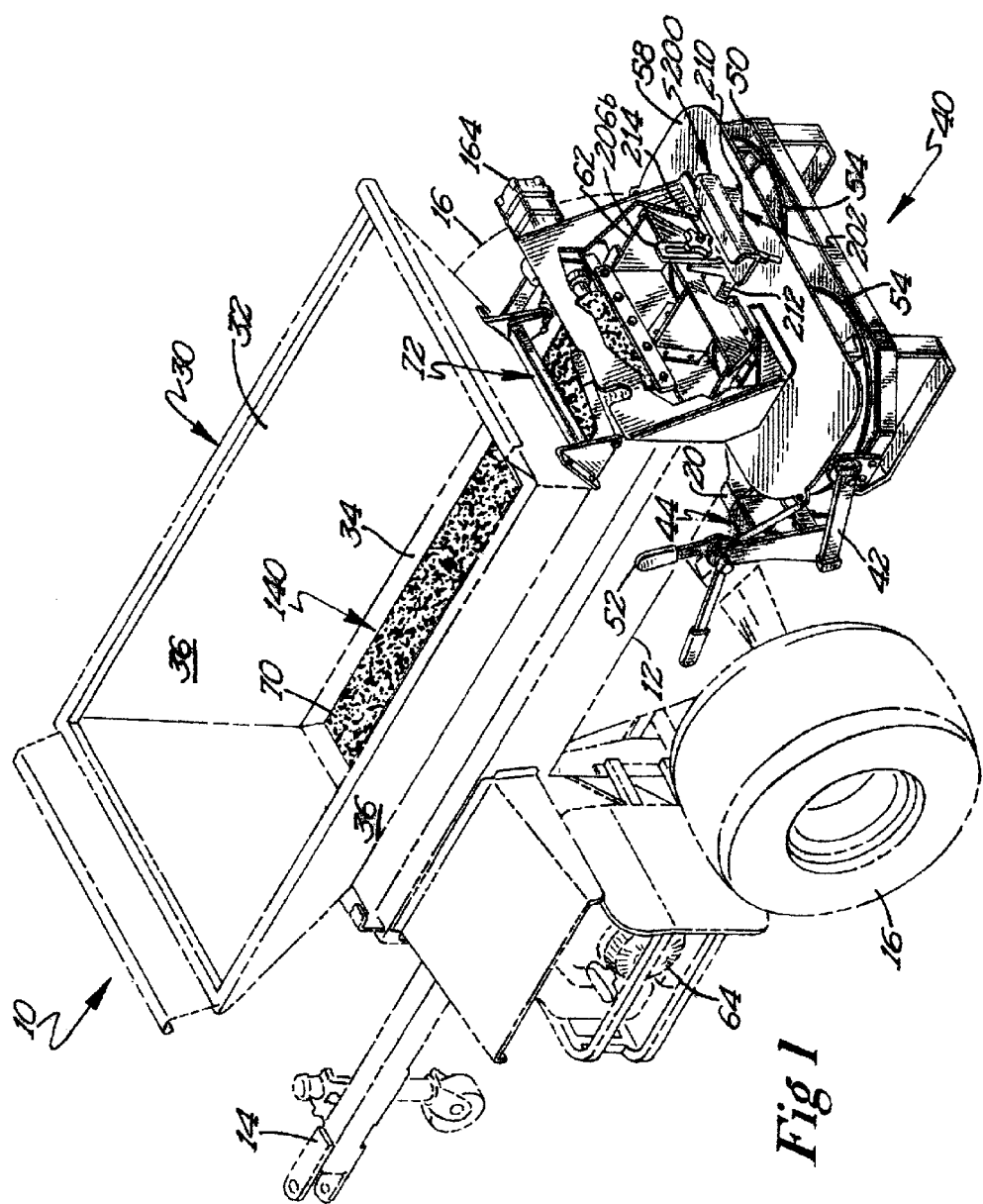
FIG. 1 shows a perspective view of a top dresser according to the preferred teachings of the present invention, with portions being broken away to expose constructional details.
Figure 2:
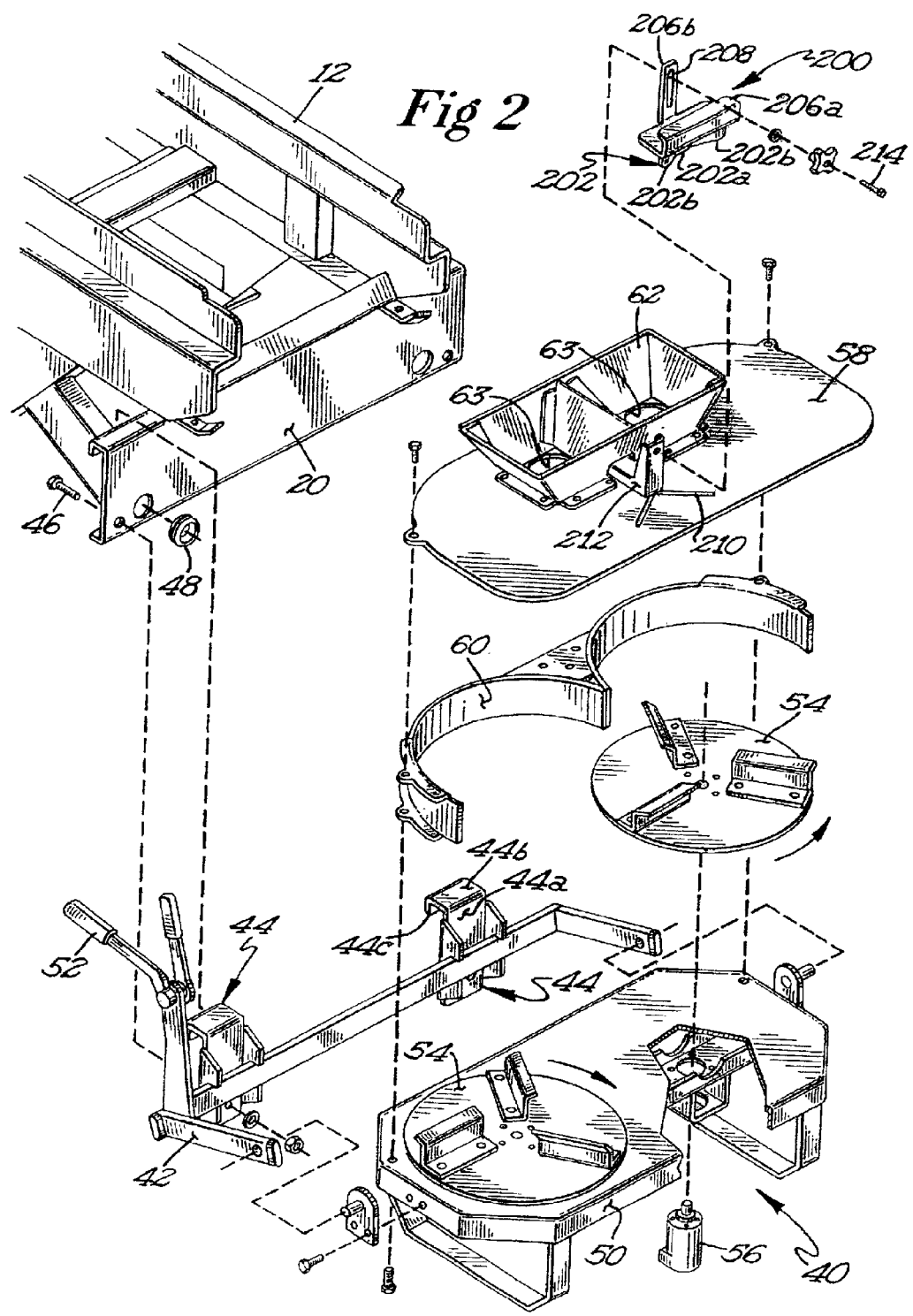
FIG. 2 shows a partial, exploded, perspective view of the top dresser of FIG. 1, with portions being broken away to expose constructional details.
Figure 3:
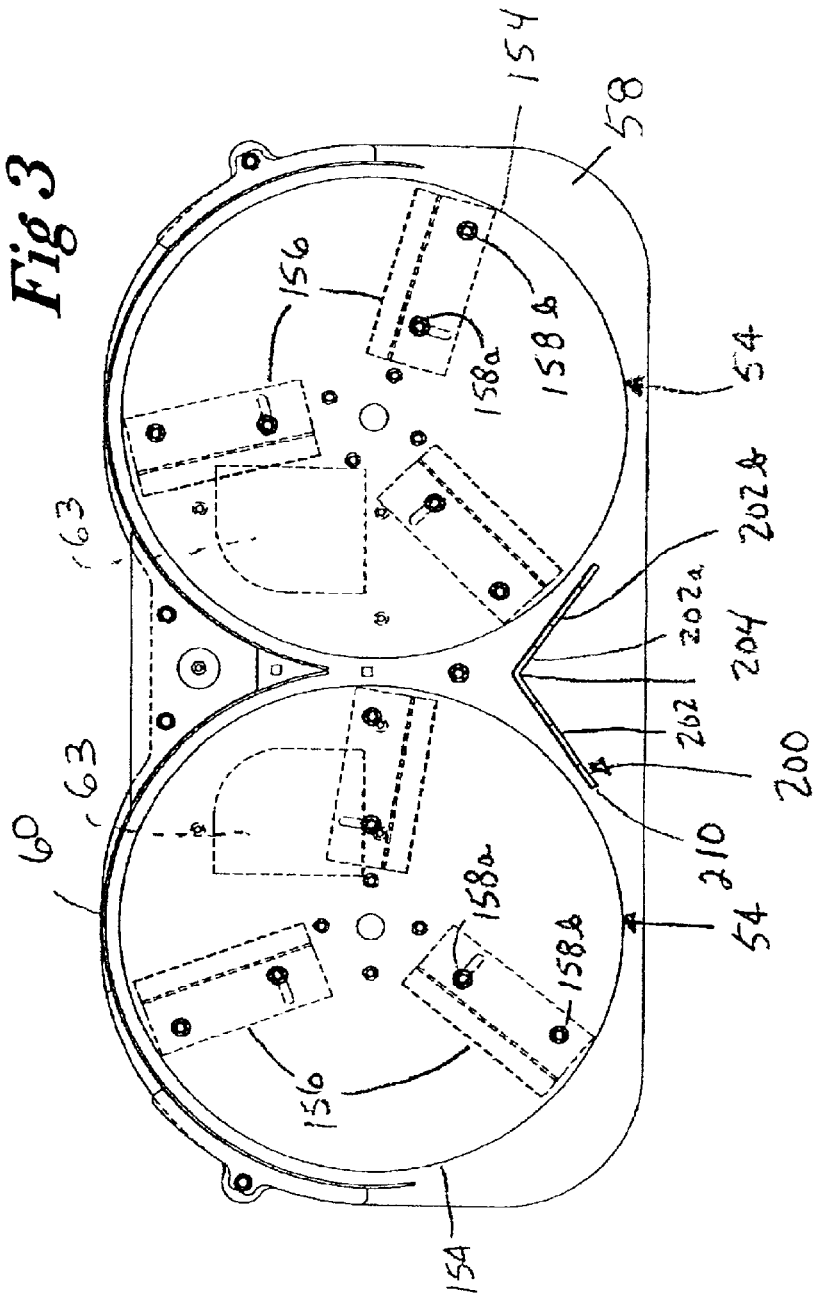
FIG. 3 shows a partial bottom view of an embodiment of a spinner assembly including a diverter of the top dresser of FIG. 1, with portions being removed to expose constructional details.
Figure 4:
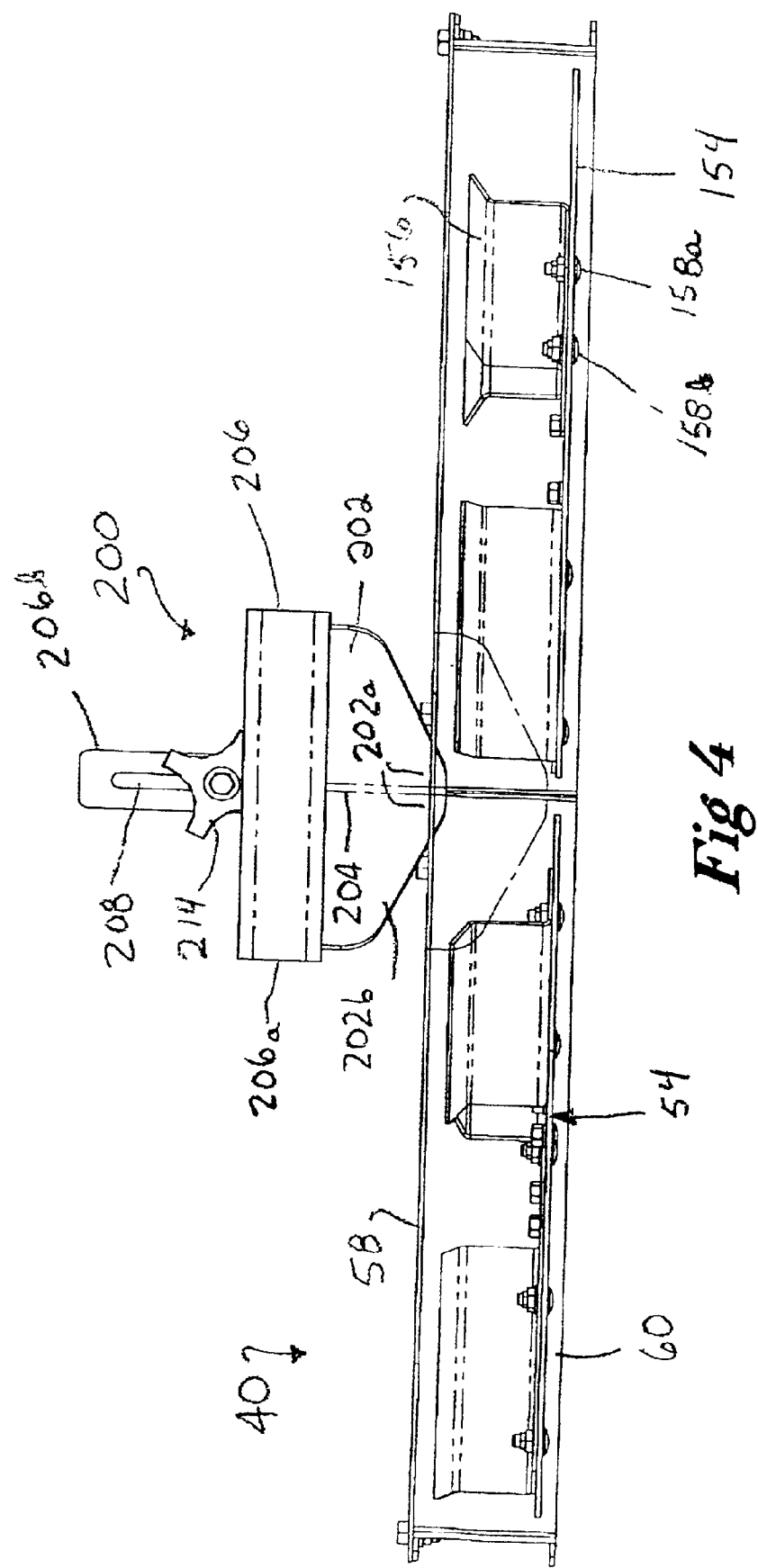
FIG. 4 shows a partial rear view of an embodiment of a spinner assembly of FIG. 3 including a diverter of the top dresser of FIG. 1, with portions being removed to expose constructional details.
Figure 5:
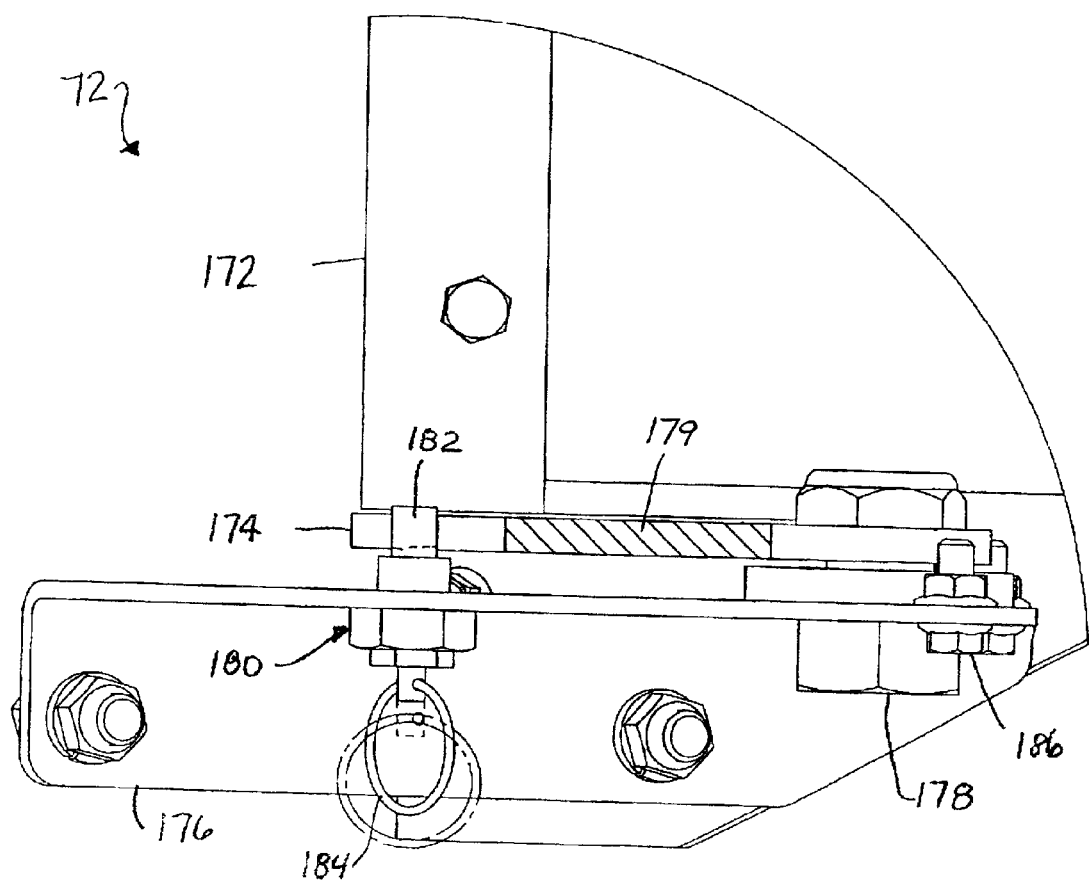
FIG. 5 shows a partial rear view of a manually adjustable metering gate of the top dresser of FIG. 1 having a plunger in a first position, with portions shown in cross section and being removed to expose constructional details, with portions shown in phantom to show the plunger in a second position.
Figure 6:
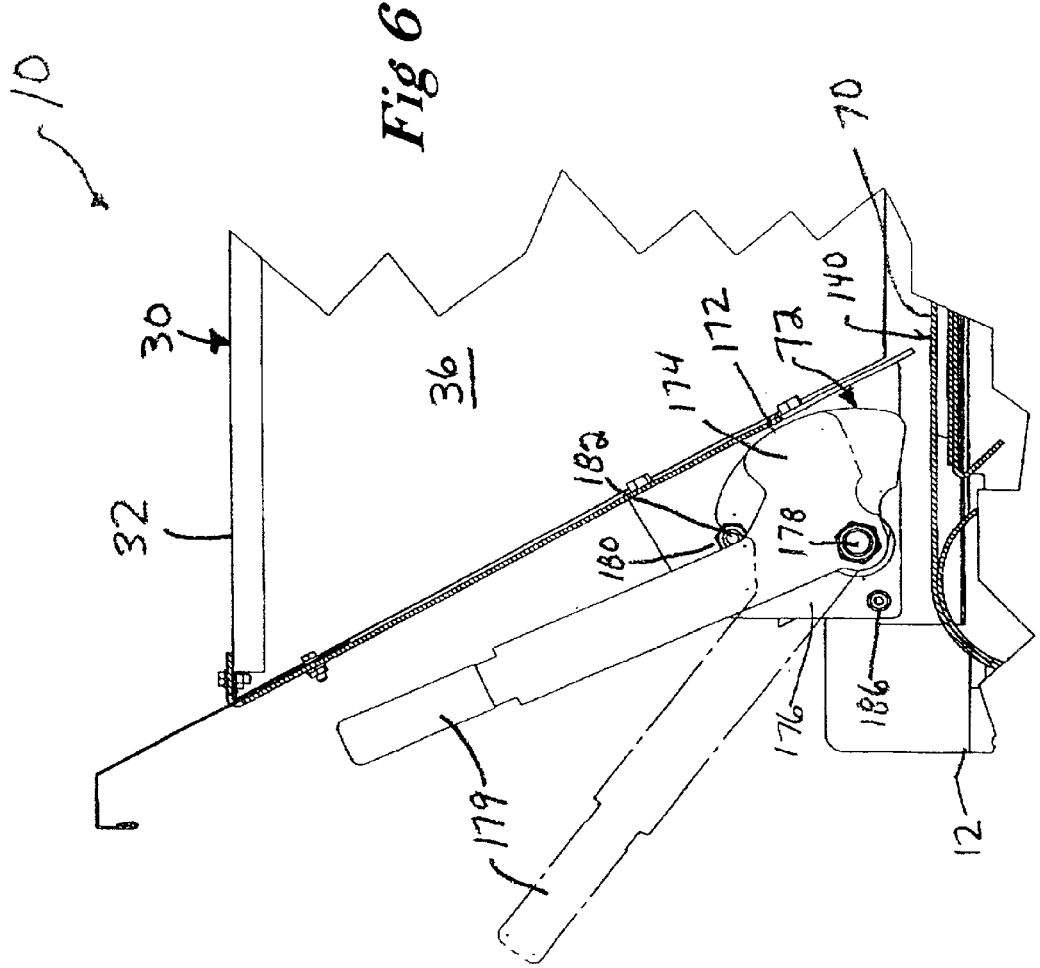
FIGS. 6 and 7 show partial side views of the manually adjustable metering gate of the top dresser of FIG. 1 in first and second ranges, with portions shown in cross section and being removed to expose constructional details, with portions shown in phantom to show alternate positions of the metering gate in the first and second ranges.
Figure 7:
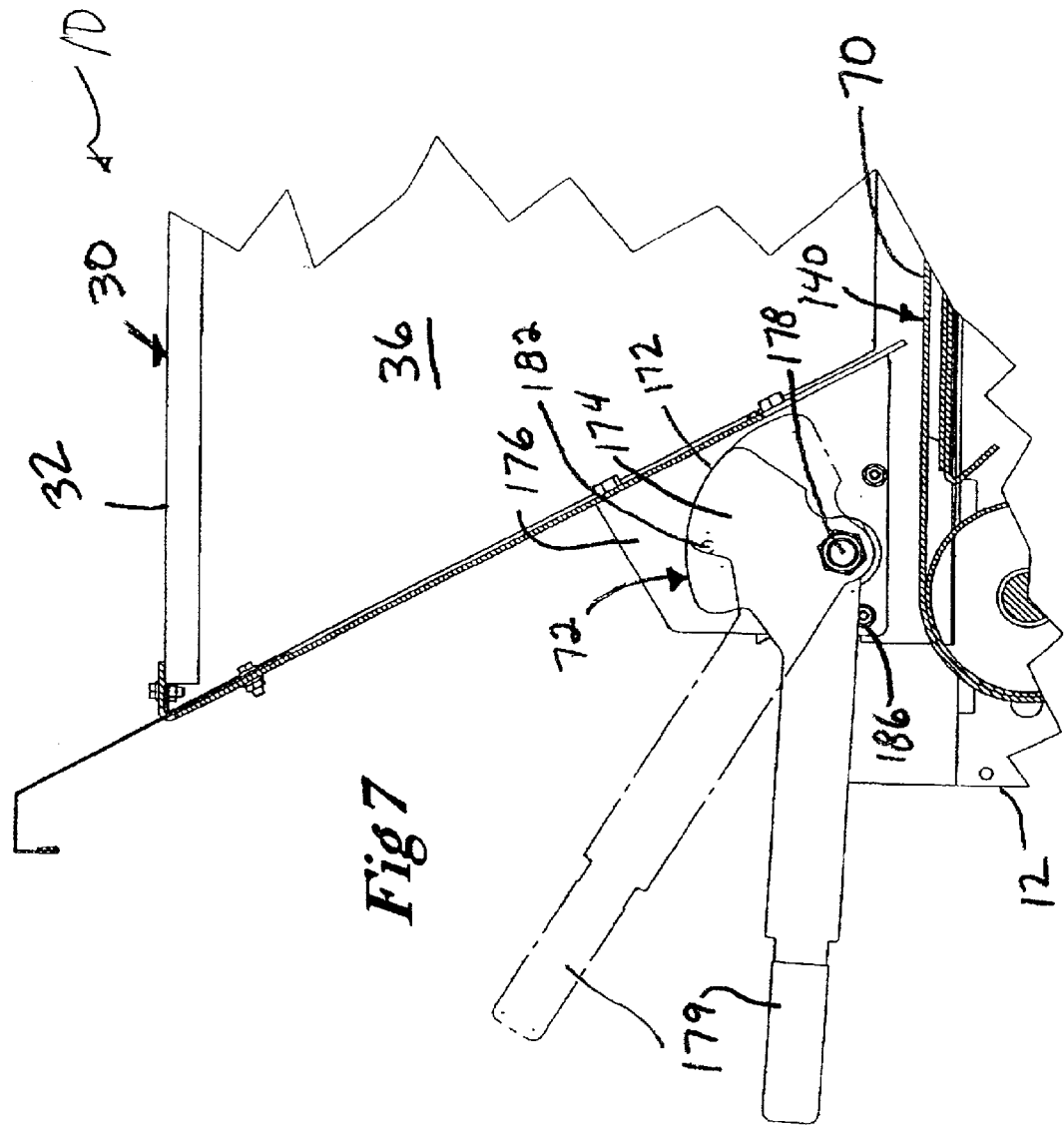

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "end", "side", "above", "longitudinal", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENT

A top dresser according to the preferred teachings of the present invention is shown in the drawings and generally designated 10. In the most preferred embodiment of the present invention, top dresser 10 is an improvement of the type shown and described in U.S. Pat. No. 6,149,079. For purpose of explanation of the basic teachings of the present invention, the same numerals designate the same or similar parts in the present figures and the figures of U.S. Pat. No. 6,149,079. The description of the common numerals and top dresser 10 may be found herein and in U.S. Pat. No. 6,149,079, which is hereby incorporated herein by reference.

In one form, top dresser 10 includes a frame 12 having a drawbar 14 by which top dresser 10 can be coupled to a towing tractor or utility vehicle to allow the tractor or utility vehicle to tow top dresser 10. In this form, frame 12 is movably supported upon the ground by a pair of high flotation tires 16. Frame 12 can include a cross beam 20 extending transversely generally perpendicular to the pulling direction of top dresser 10 and located at the back of frame 12 behind tires 16. Cross beam 20 has a rear face, a top face, and a front face. In another form, top dresser 10 includes a frame 12 configured to directly mount to or to be a part of a tractor or utility vehicle. In this alternative form, top dresser 10 may be fully supported by the tractor or utility vehicle.

A hopper 30 for containing top dressing material can be mounted on frame 12 to thereby be movably supported relative to the ground or similar turf surface. Hopper 30 is generally configured to dispense the material contained within hopper 30 through the back of hopper 30 to permit the distribution of the material over a surface. As illustrated for exemplary purposes, hopper 30 generally includes an open top 32, a closed floor or bottom 34, first and second, sloping, closed sides 36, a back and a front. In one form, sides 36 can extend at an obtuse angle outwardly relative to bottom 34 to guide and concentrate the material contained in hopper 30.

In one form, sheeting 70 can be utilized in a horizontally extending, endless belt conveyor 140 located at the bottom of hopper 30 to advance or convey material contained in hopper 30 toward the end opening of the back of hopper 30. A detailed description of such a conveyor system is shown in U.S. Pat. No. 4,438,873, which is hereby incorporated herein by reference. Particularly, conveyor 140 can be disposed so that sheeting 70, typically in the form of an endless belt, passes beneath hopper 30 so that whatever material contained in hopper 30 is gravitationally discharged from hopper 30 onto conveyor 140 to be conveyed to the back of hopper 30. Sheeting 70 typically passes over a first, generally cylindrical roller rotatably mounted on a transverse, horizontal shaft which may be adjustable in a fore and aft direction. Conveyor 140 can further include a second, generally cylindrical roller mounted for rotation on a transverse, horizontal shaft, with the second roller being parallel to and horizontally spaced from the first roller. The second roller can be rotated by a hydraulic motor 164. Sheeting 70 can pass over a platen or bed plate that is fixedly supported by bottom 34 of hopper 30 of top dresser 10, with the bed plate optionally including a coating or the like to reduce friction between the bed plate and sheeting 70. Thus, conveyor 140 dispenses material from hopper 30 through the back of hopper 30.

In one form, sheeting 70 can be formed from an endless belt having an outer surface which is relatively smooth between sides 36 of hopper 30 and in the most preferred form with the outer surface including a shallow pattern. Particularly, conveyor 140 could include nonpatterned sheeting initially included in prior drop top dressers of the type shown in U.S. Pat. No. 4,438,873 or could sheeting including ribs and channels as taught by U.S. Pat. No. 5,307,952 due to its material gripping characteristics. Specifically, sheeting 70 can include relatively small depressions of a size generally corresponding to the particle size of the top dressing material which is typically dispensed by top dresser 10. In this form, the depressions are frequently of a size no larger than 0.20 inch (0.5 cm) in any direction and can be generally rectangular shaped of a length of approximately 0.20 inch (0.5 cm), a width of approximately 0.15 inch (0.38 cm) and a depth of approximately 0.05 inch (0.13 cm) to accommodate common top dressing materials. Sheeting 70 can be formed from rubber or other materials such as plastic which are not subject to corrosion or other degradation by exposure to top dressing material as long as the functional requirements for conveyor 140 are satisfied.

Conveyor 140 dispenses material from hopper 30 through the back of hopper 30 in the preferred form. Top dresser 10 may further include a metering gate 72 movably mounted at the back of hopper 30 and movable relative to conveyor 140 and to an opening formed in the back of hopper 30 to meter the rate at which material is being dispensed from hopper 30. In one form, metering gate 72 can be movable relative to the hopper opening and away from conveyor 140 to create or provide a larger gap for material to pass. Typically, metering gate 72 is pivotally mounted to top dresser 10 and is movable either manually or by hydraulic actuators. Of course, it can be appreciated that the amount of material passing from hopper 30 is directly related to the gap of gate 72 relative to conveyor 140, with a larger gap allowing more material to pass from hopper 30.

In the most preferred form, gate 72 is manually operated and is adjustable to allow material to pass from hopper 30 in an amount of a first range of spacings from conveyor 140 or in an amount of a second range of spacings from conveyor 140 different than the first range of spacings. In the preferred form, the spacing from conveyor 140 and thus the amount of material passing from hopper 30 in the second range of spacings is considerably greater than in the first range of spacings. Particularly in the form shown, gate 72 includes a closure plate 172 extending laterally across conveyor 140 and perpendicular to the movement direction of the upper run of sheeting 70. Generally, plate 172 closes an opening in the back of the hopper 30, with its lower edge creating or providing the gap for material to pass therethrough. Closure plate 172 can have a planar shape or can have arcuate cross sections.

In the preferred form, closure plate 172 is pivotally mounted relative to conveyor 140. Particularly, closure plate 172 extends between first and second pie shaped side plates 174 located on opposite sides of conveyor 140 and parallel to the movement direction of the upper run of sheeting 70. First and second mounts 176 are located on opposite sides of and generally parallel to side plates 174. Side plates 174 are pivotably mounted to mounts 176 such as by bolts 178 about an axis extending laterally across conveyor 140 and perpendicular to the movement direction of the upper run of sheeting 70. A handle 179 extends from at least one side plate 174 for grasping by the operator and pivoting side plates 174 and closure plate 172 about bolts 178. As is well known, bolts 178 can include provisions for providing frictional forces to the pivoting of side plates 174 relative to mounts 176.

According to the preferred teachings of the present invention, suitable provisions are provided for inadvertently metering gate 72 between the first and second ranges of spacings and in the most preferred form from manually moving from the first range to the second range unless additional manual actuation other than to gate 72 occurs. Particularly, in the most preferred form, a stop 180 is mounted to one mount 176 and includes a spring biased plunger 182 having a ring 184 or other suitable grasping mechanism for manually pulling on plunger 182 against the bias of the spring. Plunger 182 is normally biased to an extended position to be positioned in the pivotal movement path of the associated side plate 174 and to abut with a side edge thereof. Additionally, plunger 182 can be retracted by pulling on ring 184 such that plunger 182 in a retracted position is not in the pivotal movement path of the associated side plate 174 such that side plate 174 and thus gate 72 can be pivoted to its second range of spacings. Once in the second range of spacings, ring 184 can be released allowing plunger 182 to move under its bias until its free end abuts with and is slideable upon the face of side plate 174 extending parallel to the pivotal movement path, with plunger 182 extending at a nonparallel and specifically generally perpendicular angle to side plate 174 in the preferred form.

It should be appreciated that gate 72 is pivotable from a position where closure plate 172 generally abuts with sheeting 70 providing the minimal gap desired to a position where side plate 174 abuts with plunger 182 and closure plate 172 has a larger gap from sheeting 70. This defines the upper and lower limits of the first range of spacings. Additionally, it can be appreciated that plunger 182 abutting with side plate 174 prevents gate 72 from being manually pivoted beyond the first range unless additional manual actuation other than to gate 72 (in this case pulling upon ring 184) is performed.

To move into the second range of spacings, the operator must grasp ring 184 in the preferred form and move plunger 182 against its bias and out of the pivotal movement path of side plate 174. Once that has been accomplished, gate 72 can be pivoted into its second range. While in the second range, ring 184 can be released allowing plunger 182 to move under its bias and engage the face of side plate 174. Thus, gate 72 can be pivoted from generally its position providing the maximum gap between closure plate 172 and sheeting 70 to the position where the end of plunger 182 slides off side plate 174 and moves under its bias to again be in the pivotal movement path of side plate 174. This defines the upper and lower limits of the second range of spacings. Additionally, it can be appreciated that when plunger 182 slides off side plate 174, a mechanical audible snap or signal is provided by the stop 180 which provides a nonvisual indication to the operator that the gate 72 is being moved from its second range into its first range. Additionally, in the most preferred form, a nonmoveable stop 186 is provided for abutting with handle 179 to define the upper limit of the second range of spacings.

Further, top dresser 10 in accordance with the present invention includes a spinner assembly 40 for dispensing the material contained in hopper 30 to the surface. Spinner assembly 40 can distribute the material to a width generally greater than the width of hopper 30 and top dresser 10. Spinner assembly 40 in accordance with the present invention can include a U-shaped support 42 removably secured to frame 12. Particularly, in the most preferred form, first and second clips 44 are secured to the central portion of support 42 in a spaced relation such as by welding. Clips 44 each generally include a front plate 44a for abutting with the rear face of cross beam 20, a top plate 44b extending generally perpendicularly from front plate 44a for a distance generally equal to the thickness of cross beam 20, and a latching plate 44c extending generally perpendicularly downward from top plate 44b and parallel to front plate 44a. In the most preferred form, clips 44 are positioned with top plate 44b extending over the horizontal top face of cross beam 20 and with latching plate 44c and front plate 44a extending over the vertical front and back faces of cross beam 20, respectively. Clips 44 can be secured in position such as by bolts or similar pins 46 removably extending through cross beam 20 and clips 44. Rubber grommets 48 can be mounted in cross beam 20 for abutting with support 42 when secured to cross beam 20 by clips 44.

Assembly 40 may further include a carrier 50 pivotally mounted to support 42 about a transversely extending carrier axis, such as between the free ends of the legs of support 42. Suitable provisions such as a lockable lever 52 pivotably mounted to support 42 and connected by suitable linkage to carrier 50 can be provided to selectively position carrier 50 at a desired pivotal angle relative to support 42.

Assembly 40 may include one or more spinners 54 rotatably mounted to carrier 50 about vertical axes in a rotation direction. Spinners 54 are movable along the turf surface with the vertical rotation axes being generally perpendicular to the operation direction. In particular, each spinner 54 includes a circular disk 154 of a diameter which in the most preferred form is 18 inches (45 cm) and having a center corresponding to the rotation axis. Circular disks 154 are generally perpendicular to the rotation axes and each include a top. A plurality of fins 156 such as three as shown are provided on the top of each disk 154 in a general radial orientation. In the most preferred form, the orientation of fins 156 on disk 154 is adjustable, and in the most preferred form, fins 156 are secured by first and second bolts 158a and 158b to disk 154, with the radially outer bolts 158a being in a fixed position relative to disk 154 and fins 156 while the radially inner bolts 158b allowing pivotable movement of fins 156 about the bolts 158a such as by extending through arcuate slots formed in disk 154. In the most preferred form, fins 156 each have radial cross sections of a generally Z-shape and extend a height above disk 154 in the order of 2.5 inches (6.35 cm). When a plurality of spinners 54 are mounted to assembly 40, spinners 54 are mounted to carrier 50 about spaced, parallel axes extending generally perpendicular to the carrier axis and with disks 154 being parallel to and closely adjacent carrier 50. Each spinner 54 may include a hydraulic motor 56 for rotating spinner 54 relative to carrier 50 or may be otherwise driven as will be recognized by those skilled in the art. In the most preferred form, spinners 54 are counter rotating towards each other in the front in the operation direction and away from each other in the rear in the operation direction to thereby create a rearward downstream nip in the operation direction.

Spinners 54 are located between carrier 50 and an upper sheet 58 held in a parallel relation to carrier 50 by a spinner guide 60. Sheet 58 is located perpendicular to the axes of spinners 54 and extends parallel to spinners 54. Carrier 50 and upper sheet 58 are spaced generally equal to the combined height of disks 154 and fins 156 of spinners 54 and specifically allowing operational clearance between spinners 54 and carrier 50 and upper sheet 58. In the preferred embodiment shown, guide 60 is in the form of interconnected semi-cylindrical portions extending around the front and sides of spinners 54. A dividing chute 62 is positioned on upper sheet 58 for receiving material from conveyor 140 and generally directing the material dispensed from the transverse half of sheet 70 upon the top of the respective spinner 54 at an infeed radial position through openings 63 formed in upper sheet 58.

According to the preferred teachings of the present invention, a diverter 200 is located in the rotation direction past the infeed radial position defined by openings 63 and contacts material leaving spinners 54 to evenly distribute the material across the width of the ribbon of material distributed by top dresser 10, with the width of the ribbon being perpendicular to the operation direction traveled by top dresser 10 during the top dressing operation. With two spinners 54 rotating in opposite, counter directions of the most preferred form, diverter 200 can be formed as a single element. In the preferred form shown, diverter 200 is generally V-shaped and includes first and second panels 202 interconnected along their forward, leading end or edges 204. Leading edges 204 are spaced from disks 154 and located midway between disks 154 of spinners 54 and along a dividing plane that is parallel to tangents of disk 154 which are parallel to each other. Leading edges 204 are located intermediate the infeed radial position and the maximum rearward extent of circular disks 154 in the operation direction of top dresser 10. Panels 202 extend at equal acute angles rearwardly from the dividing plane and in the most preferred form at an angle in the order of 55°. Panels 202 extend generally tangentially to disks 154 at points generally one-eighth the circumference from the points on a line extending through the axes of spinners 54.

In the most preferred form, diverter 200 is secured to upper sheet 58 and extends downwardly therefrom and in the most preferred form is adjustably secured thereto. Specifically, in the preferred form, diverter 200 is mounted to a bracket 206 including a plate 206a from which panels 202 extend generally perpendicularly. Bracket 206 further includes a tab 206b extending generally perpendicular from a front edge of plate 206a in the opposite direction as diverter 200. Tab 206b includes an elongated slot 208 extending in a direction perpendicular to plate 206a. Upper sheet 58 includes a V-shaped slot 210 of a size and shape for insertion and slideable receipt of diverter 200. A mount 212 extends generally perpendicular from upper sheet 58. A bolt 214 having a hand knob extends through slot 208 of tab 206b and is threadedly received in mount 212. Therefore, tab 206b and thus diverter 200 can be adjustably positioned relative to mount 212 and upper sheet 58 when bolt 214 is in a loosened condition and can be fixed in that position by simply tightening bolt 214.

Each panel 202 includes a rectangular portion 202a having a height generally equal to but slightly less than the spacing of disks 154 from upper sheet 58. The width of each portion 202a is generally equal to the minimum spacing of disks 154 from the dividing plane or in other words from leading edge 204 to a point along a tangent to circular disks 154 parallel to the operation direction and generally not extending within the diametric extent of circular disks 154. The lower edges of portion 202a extend in a single plane perpendicular to the axes of spinners 54 and spaced vertically above and parallel to the top of circular disks 154.

Each panel 202 includes a wedge shaped wing portion 202b in the same plane as portions 202a and having a lower edge extending from the lower edge of portion 202a to a height generally equal to one quarter of the spacing of disks 154 from upper sheet 58 and below the upper extent of fins 156 generally equal to one third of the height of fins 156. Thus, the lower edges of portions 202b are spaced vertically above and in the preferred form of increasing spacing above the top of circular disks 154 but do not extend in a single plane perpendicular to the axes of spinners 54 and thus at differing spacing above the top of circular disks 154. Wing portions 202b have a radial extent which is generally equal to one half of the radial extent of disks 154. The free, rearward end opposite leading edges 204 are radially spaced intermediate leading edges 204 and the maximum rearward extent and specifically in front of the maximum rearward extent of spinners 54 in the operation direction. In the most preferred form, the corner between the lower edge and the free edge of portions 202b are rounded to have an arcuate configuration.

In the preferred form, diverter 200 is located in the downstream nip between counter rotating spinners 54, with panels 202 being angled rearwardly in the direction of rotation of spinners 54 from leading edge 204. Specifically, leading edges 204 are located forwardly of the rear edges of portions 202b in turn located forwardly of the rearward maximum extent of disks 154. The rear edges of portions 202b have extents generally corresponding to the points of tangent of tangent lines parallel to panels 202 such that the spacing from panels 202 from disk 154 continually decrease from edges 204 to the rear edges of portions 202b.

Now that the basic construction of top dresser 10 according to the preferred teachings of the present invention has been set forth, preferred modes of operation and advantages of top dresser 10 can be explained. Specifically, in operation, spinners 54 are typically rotated before conveyor 140 is actuated. Any material located on spinners 54 will be thrown from spinners 54 by centrifugal forces as the result of rotation of spinners 54. Thus, spinners 54 will spin off any material located thereon before any material is conveyed thereon by conveyor 140. Thus, clumping of the dispensed material at start up is avoided according to the teachings of the present invention. The speed at which spinners 54 rotate can be adjusted according to the needs of the particular application. The shaft of the second roller is then rotated to advance sheeting 70 of conveyor 140 at a speed appropriate to convey material at the desired rate. With advancement of sheeting 70, material is carried by sheeting 70 beneath metering gate 72 and conveyed into dividing chute 62 and onto spinners 54, with the material being thrown by centrifugal forces from spinners 54 and thereby dispensed onto the turf by top dresser 10 as top dresser 10 is being pulled. The amount of material which is dispensed by top dresser 10 being dependent upon the vertical spacing of metering gate 72 from sheeting 70 and by the speed of sheeting 70, both of which may be independently adjustable and upon the ground speed of top dresser 10.

When it is desired to stop dispensing material, movement of sheeting 70 relative to hopper 30 is discontinued so that no further material is delivered by conveyor 140 to spinner assembly 40. It is advantageous to delay the stopping rotation of spinners 54 until after the material is no longer being dispensed to eliminate or reduce any residual material remaining on spinners 54 at the start of the next operation.

According to the teachings of the present invention with diverter 200 secured in a first, upper, light spread position, panels 202 do not detrimentally extend beyond and particularly below upper sheet 58 towards spinners 54, with the lower edges of portion 202a extending into slot 210 but with the lower edges of wing portion 202b generally not extending in slot 210 in the preferred form. With diverter 200 in the upper position, top dresser 10 operates in a manner almost identical to that of top dresser 10 as shown and described in U.S. Pat. No. 6,149,079 and thus will not be described herein in detail. Specifically, metering gate 72 is adjustable in the first range of spacings and is prevented from being inadvertently manually adjusted into the second range by stop 180. The width of the material dispersed perpendicular to the direction traveled by top dresser 10 is variable in the most preferred form by adjusting the rotational speed of spinners 54 and by adjusting the angle of carrier 50. According to the teachings of the present invention, top dresser 10 is able to top dress a width up to twenty times the width of conveyor 140, ten times the maximum width of hopper 30 and up to five times the width of top dresser 10 and specifically in the preferred form in the range of 15 to 30 feet (4.6 to 9.1 m). The thickness of the material dispersed perpendicular to the turf surface is generally consistent throughout the width and generally in the range of 1/32 to 1/8 inches (0.08 to 0.32 cm).

According to the teachings of the present invention, diverter 200 can be secured in a second, lower, heavy spread position such that panels 202 extend beyond and particularly below upper sheet 58 towards spinners 54, with top dresser 10 intended to operate in a heavy spread mode. In particular, diverter 200 extending in nonradial directions from the rotational axes of spinners 54 prevent passage of top dressing material therethrough. However, the lower edges of panels 202 extend at different distances into the thickness of the propelled top dressing material, with the lower edges of portion 202b having linearly decreasing distances into the thickness of the propelled top dressing material. Further, in the preferred form, the lower edges of both portions 202a and 202b extend less than the thickness of the propelled top dressing material such that a portion of the thickness of the top dressing material is propelled radially below diverter 200. It can be appreciated that the kinetic energy of the top dressing material from the rotation of spinners 54 is not completely stopped as in the case of the use of a shroud of the type disclosed in U.S. Pat. No. 4,032,074 but rather is redirected or diverted from its radial path in the initial rotational portion of spinners 54 after the initial infeed and after guide 60 to later rotational portions of spinners 54. Thus, since release of material is highest in the initial rotational portion of spinner 54, diverting this material tends to more evenly distribute the material propelled by spinners 54. Further, the decreasing height of portions 202b reduces the amount of material being diverted to enhance this even distribution function. Furthermore, the width of the ribbon of material distributed by top dresser 10 of the present invention is not as restricted as when shrouds are utilized. Additionally, the ribbon of material distributed by the top dresser 10 is generally uniform across its entire width.

In the preferred form, other adjustments are made to top dresser 10 for operation in the heavy spread mode. Specifically, the angle of fins 156 on circular disk 154 could be adjusted such as by sliding bolts 158a to the opposite end of the arcuate slots, the speed of spinners 54 could be reduced as the significant increase of material provided to spinners 54 could slow down or stop spinners 54 and specifically the hydraulic motors 56 thereof, and gate 72 is pivoted to its second range with the free end of plunger 182 sliding on the face of side plate 174 in a manner previously discussed. In the preferred form, top dresser 10 has been modified from the form at the filing of U.S. Pat. No. 6,149,079 to include a larger hopper opening which is closed by gate 72 to allow greater material to pass. The width of the material dispersed perpendicular to the direction traveled by top dresser 10 is variable in the most preferred form by adjusting the rotational speed of spinners 54 and by adjusting the angle of carrier 50.

Utilizing top dresser of the most preferred form with diverter 200 in its lower position, top dresser 10 is able to top dress a width up to twelve times the width of conveyor 140, six times the maximum width of hopper 30 and up to three times the width of top dresser 10 and specifically in the preferred form in the range of 9 to 18 feet (2.7 to 5.5 m). The thickness of the material dispersed perpendicular to the turf surface is generally consistent throughout the width and generally in the range of ⅛ to 5/16 inches (0.32 to 0.79 cm). In this regard, it can be appreciated that the thicker the material dispersed, the importance of consistency also increases.

Now that the basic teachings of the present invention have been explained, many extensions and variations will be obvious to one having ordinary skill in the art. For example, although top dresser 10 of the most preferred form includes the combination of several, unique features believed to obtain synergistic results, apparatus for dispensing material could be constructed according to the teachings of the present invention including such features singly or in other combinations.

Likewise, although top dresser 10 in the most preferred form is operable in both light and heavy spread modes, top dresser 10 according to the teachings of the present invention could be designed to perform only the heavy spread mode. In this regard, diverter 200 could be formed as an integral part of guide 60. Similarly, diverter 200 could have other forms and shapes according to the teachings of the present invention which does not stop the kinetic energy of the top dressing material propelled by spinners 54 but rather redirects the top dressing material.

Additionally, although diverter 200 in the preferred form is positionable in either first and second positions through a threaded, lost motion connection, other manners of positioning diverter 200 can be utilized according to the teachings of the present invention.

Similarly, although top dresser 10 in the most preferred form includes a pair of counter rotating spinners 54, top dresser 10 according to the teachings of the present invention could include a single spinner 54 or spinners 54 rotating in the same direction. Likewise, spinner guide 60 could include other forms and configurations including but not limited to a single C configuration, a radially spaced double C configuration or the like. Further, spinners 54 could take other forms according to teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Top dresser for dispensing material to a surface comprising, in combination: a hopper for containing top dressing material and movably supported relative to the surface; at least a first spinner rotatable about a vertical axis in a rotation direction, with the spinner including a circular disk of a diameter and having a center corresponding to the vertical axis, with the circular disk being generally perpendicular to the vertical axis, with the circular disk having a top, with the spinner further including a plurality of fins on the top of the circular disk and in a radial orientation, with the spinner being movable along the surface in an operation direction generally perpendicular to the vertical axis and with the circular disk being generally parallel to the surface with top dressing material being dispensed from the hopper onto the top of the circular disk at an infeed radial position; and a diverter located in the rotation direction past the infeed radial position, with the diverter having a forward end spaced from the circular disk and located intermediate the infeed radial position and the maximum rearward extent of the circular disk in the operation direction, with top dressing material being propelled from the spinner by centrifugal forces as a result of rotation of the spinner and past the diverter rearward of the spinner and the diverter.

2. Top dresser for dispensing material to a surface comprising, in combination: a hopper for containing top dressing material and movably supported relative to the surface; at least a first spinner rotatable about a vertical axis in a rotation direction, with the spinner including a circular disk of a diameter and having a center corresponding to the vertical axis, with the circular disk being generally perpendicular to the vertical axis, with the circular disk having a top, with the spinner further including a plurality of fins on the top of the circular disk and in a radial orientation, with the spinner being movable along the surface in an operation direction generally perpendicular to the vertical axis and with the circular disk being generally parallel to the surface with top dressing material being dispensed from the hopper onto the top of the circular disk at an infeed radial position; and a diverter located in the rotation direction past the infeed radial position, with the diverter having a forward end spaced from the circular disk and located intermediate the infeed radial position and the maximum rearward extent of the circular disk in the operation direction, with the diverter having a lower edge spaced vertically above the top of the circular disk.

3. The top dresser of claim 2 with the lower edge located at differing spacing above the top of the circular disk.

4. The top dresser of claim 3 with the lower edge, having a first portion generally parallel to the top of the circular disk from the forward edge to a point along a tangent to the circular disk parallel to the operation direction and generally not extending within the diametric extent of the circular disk, with the lower edge having a second portion extending from the first portion and of increasing vertical spacing above the top of the circular disk.

5. The top dresser of claim 4 with the diverter having a rearward edge opposite to the forward edge, with the rearward edge being radially spaced intermediate the forward edge and the maximum rearward extent in the operation direction.

6. The top dresser of claim 5 with the rearward edge located in front of the maximum rearward extent in the operation direction.

7. Top dresser for dispensing material to a surface comprising, in combination: a hopper for containing top dressing material and movably supported relative to the surface; at least a first spinner rotatable about a vertical axis in a rotation direction, with the spinner including a circular disk of a diameter and having a center corresponding to the vertical axis, with the circular disk being generally perpendicular to the vertical axis, with the circular disk having a top, with the spinner further including a plurality of fins on the top of the circular disk and in a radial orientation, with the spinner being movable along the surface in an operation direction generally perpendicular to the vertical axis and with the circular disk being generally parallel to the surface with top dressing material being dispensed from the hopper onto the top of the circular disk at an infeed radial position; a diverter located in the rotation direction past the infeed radial position, with the diverter having a forward end spaced from the circular disk and located intermediate the infeed radial position and the maximum rearward extent of the circular disk in the operation direction; and a second spinner rotatable about a vertical axis spaced from and parallel to the vertical axis of the first spinner, with the second spinner being rotatable in an opposite rotation direction than the rotation direction of the first spinner to create a rearward downstream nip in the operation direction, with the diverter being generally V-shaped and positioned in the downstream nip of the first and second spinners.

8. Top dresser for dispensing material to a surface comprising, in combination: a hopper for containing top dressing material and movably supported relative to the surface; at least a first spinner rotatable about a vertical axis in a rotation direction, with the spinner including a circular disk of a diameter and having a center corresponding to the vertical axis, with the circular disk being generally perpendicular to the vertical axis, with the circular disk having a top, with the spinner further including a plurality of fins on the top of the circular disk and in a radial orientation, with the spinner being movable along the surface in an operation direction generally perpendicular to the vertical axis and with the circular disk being generally parallel to the surface with top dressing material being dispensed from the hopper onto the top of the circular disk at an infeed radial position; and a diverter located in the rotation direction past the infeed radial position, with the diverter having a forward end spaced from the circular disk and located intermediate the infeed radial position and the maximum rearward extent of the circular disk in the operation direction, with the diverter having a rearward edge opposite to the forward edge, with the rearward edge being radially spaced intermediate the forward edge and the maximum rearward extent in the operation direction.

9. Top dresser for dispensing material to a surface comprising, in combination: a hopper for containing top dressing material and movably supported relative to the surface; at least a first spinner rotatable about an axis in a rotation direction, with top dressing material being dispensed from the hopper to the spinner and being propelled radially from the spinner by rotation of the spinner at a thickness parallel to the axis; and a diverter extending in a nonradial direction from the axis and preventing passage of top dressing material therethrough, with the diverter having an edge extending at different distances parallel to the axis into the thickness of the propelled top dressing material.

10. Top dresser for dispensing material to a surface comprising, in combination: a hopper for containing top dressing material and movably supported relative to the surface; at least a first spinner rotatable about an axis in a rotation direction, with top dressing material being dispensed from the hopper to the spinner and being propelled radially from the spinner by rotation of the spinner at a thickness; and a diverter extending in a nonradial direction from the axis and preventing passage of top dressing material therethrough, with the diverter having an edge extending at different distances into the thickness of the propelled top dressing material, with the diverter including a portion of the edge which has linearly decreasing distances into the thickness of the propelled top dressing material.

11. The top dresser of claim 10 with the top dressing material being dispensed at an infeed radial position, with the spinner being movable along the surface in an operation direction, with the diverter including a portion of the lower edge radially spaced outward of a tangent to the spinner parallel to the operation direction extending a constant distance into the thickness.

12. The top dresser of claim 11 with the constant distance being less than the thickness.

13. The top dresser of claim 12 with the portions of the edge being in a single plane.

14. Method for dispensing top dressing material to a surface comprising: rotating a spinner about an axis; dispensing top dressing material to the rotating spinner to be propelled radially from the spinner by rotation of the spinner at a thickness parallel to the axis; and extending an edge of a diverter into the thickness parallel to the axis of the propelled top dressing material, with the edge having different distances into the thickness of the propelled top dressing material.

15. Spinner assembly comprising, in combination: a spinner rotatable about an axis; a sheet located perpendicular to the axis and extending parallel to the spinner; an opening formed in the sheet for directing material to the spinner; a slot formed in the sheet; and a diverter having a shape insertable through the slot, with the diverter being positionable in a first position which does not detrimentally extend beyond the plate towards the spinner and in a second position extending beyond the plate towards the spinner.

16. The spinner assembly of claim 15 with the sheet comprising, in combination: a mount extending generally perpendicular to the sheet; a bracket extending from the diverter, with one of the bracket and the mount including a channel elongated generally perpendicular to the sheet and the other including a threadable bolt having a hand knob extending through the channel for allowing adjustable positioning of the mount relative to the bracket.

17. The spinner assembly of claim 16 with the slot and the diverter being V-shaped.

18. The spinner assembly of claim 17 with the diverter including a lower edge of a configuration which does not extend in a single plane perpendicular to the axis, with portions of the lower edge located in the slot in the first portions and remaining portions of the lower edge not extending in the slot in the first position.

19. The spinner assembly of claim 15 with the diverter including a lower edge of a configuration which does not extend in a single plane perpendicular to the axis, with portions of the lower edge located in the slot in the first portions and remaining portions of the lower edge not extending in the slot in the first position.

20. Top dresser comprising, in combination: a hopper for containing top dressing material, with the hopper including a bottom and a back; a conveyor located at the bottom of the hopper so as to have top dressing material contained in the hopper gravitationally discharged on the conveyor to be conveyed to the back of the hopper an opening formed in the back of the hopper; and a gate moveable relative to the opening and adjustable in a first range of spacings from the conveyor and adjustable in a second range of spacings from the conveyor different than the first range of spacings, with the gate being prevented from being manually moved inadvertently between the first and second ranges of spacings.

21. The top dresser of claim 20 with the gate being spaced farther from the conveyor in the second range of spacings than in the first range of spacings, with a mechanical audible signal being provided when the gate is moved from the second range of spacings to the first range of spacings.

22. The top dresser of claim 21 with the gate being prevented from moving from the first range of spacings to the second range of spacings unless additional manual actuation other than to the gate occurs.

23. The top dresser of claim 20 further comprising, in combination: a retractable plunger moveable between an extended position and a retracted position, with the gate moving along a movement path between the first and second range of spacings, with the plunger in the extended position abutting with the gate in the movement path.

24. The top dresser of claim 23 with the gate including a side plate extending parallel to the movement path and at a nonparallel angle to the plunger, with the plunger having a free end slideable upon the side plate in the retracted position and abutting with the side plate in the extended position.

25. The top dresser of claim 20 with the gate being spaced farther from the conveyor in the second range than in the first range, with the gate being prevented from moving from the first range to the second range unless additional manual actuation other than to the gate occurs.

* * * * *

UNITED STATES PATENT AND TRADEMARK OFFICE
CERTIFICATE OF CORRECTION

PATENT NO. : 6,817,552 B2 Page 1 of 1
DATED : November 16, 2004
INVENTOR(S) : Scott S. Kinkead et al.

It is certified that error appears in the above-identified patent and that said Letters Patent is hereby corrected as shown below:

<u>Column 15,</u>
Line 26, please insert -- ; -- after the word "hopper".

Signed and Sealed this

Twenty-second Day of February, 2005

JON W. DUDAS
*Director of the United States Patent and Trademark Office*